US012774150B2

(12) United States Patent
Martin et al.

(10) Patent No.: US 12,774,150 B2
(45) Date of Patent: Oct. 27, 2026

(54) EYEWEAR DISPENSING ASSEMBLY

(71) Applicant: O&M Halyard, Inc., Glen Allen, VA (US)

(72) Inventors: Jared L. Martin, Cumming, GA (US); Suraj Chivukula, Duluth, GA (US); Marshall R. Dean, Cumming, GA (US)

(73) Assignee: O&M Halyard, Inc., Glen Allen, VA (US)

( * ) Notice: Subject to any disclaimer, the term of this patent is extended or adjusted under 35 U.S.C. 154(b) by 0 days.

(21) Appl. No.: 19/053,576

(22) Filed: Feb. 14, 2025

(65) Prior Publication Data

US 2025/0263222 A1 Aug. 21, 2025

Related U.S. Application Data

(60) Provisional application No. 63/555,969, filed on Feb. 21, 2024.

(51) Int. Cl.
*B65D 83/00* (2006.01)
*B31B 50/73* (2017.01)
(Continued)

(52) U.S. Cl.
CPC ........ *B65D 83/0805* (2013.01); *B31B 50/734* (2017.08); *B65D 83/0894* (2013.01);
(Continued)

(58) Field of Classification Search
CPC A41D 13/11; A41D 13/1161; A41D 2400/52; A41D 2500/30; A41D 31/102; A41D 13/1115; A41D 13/1123; B31B 5/022; B31B 5/26; B31B 2535/00; B31B 2262/0253; B31B 27/12; B31B 5/08;
(Continued)

(56) References Cited

U.S. PATENT DOCUMENTS 1,119,213 A 12/1914 Abt
1,378,534 A 5/1921 Fitzgerald
(Continued)

FOREIGN PATENT DOCUMENTS

DE 199 57 0536 A1 5/2001
EP 0 242 674 A2 10/1987
(Continued)

OTHER PUBLICATIONS

International Search Report and Written Opinion for PCT/US2025/015959, dated May 12, 2025, 14 pages.

*Primary Examiner* — Jacob A Smith
(74) *Attorney, Agent, or Firm* — Dority & Manning, P.A.

(57) ABSTRACT

A dispensing assembly includes a dispenser having a dispensing opening, a shelf, and a retainer. The dispenser includes a front panel, a rear panel, a top panel, a bottom panel, a first side panel, and a second side panel, and an attachment panel, altogether defining an internal chamber configured to receive a stack of articles. The retainer is configured to maintain the stack of articles in a predetermined arrangement within the internal chamber. The retainer is integrally formed from a contiguous piece of material with the front panel, rear panel, first side panel, and second side panel. The retainer is configured to retain the stack of articles in the stacked arrangement within the chamber.

14 Claims, 10 Drawing Sheets

(51) Int. Cl.
*B65D 83/08* (2006.01)
*B31B 105/00* (2017.01)
*B31B 110/30* (2017.01)
*B31B 120/10* (2017.01)

(52) U.S. Cl.
CPC ... *B31B 2105/0027* (2017.08); *B31B 2110/30* (2017.08); *B31B 2120/10* (2017.08)

(58) Field of Classification Search
CPC .............. B31B 2262/12; B31B 50/734; B31B 2105/0027; B31B 2120/10; B31B 2110/30; B65D 83/0805; B65D 83/0894
USPC .......................................................... 493/121
See application file for complete search history.

(56) References Cited

U.S. PATENT DOCUMENTS

| | | | | |
|---|---|---|---|---|
| 1,875,781 | A | 9/1932 | Turner | |
| 3,450,308 | A | 6/1969 | Schoenefeld | |
| 4,039,118 | A * | 8/1977 | Kawaoka | B65D 83/06 222/530 |
| 4,252,236 | A | 2/1981 | Roccaforte | |
| 4,405,044 | A | 9/1983 | Flower et al. | |
| 4,714,191 | A * | 12/1987 | Richardson | B65D 83/0805 206/390 |
| 5,056,683 | A | 10/1991 | O'Brien et al. | |
| D322,905 | S | 1/1992 | Decker | |
| 5,143,210 | A | 9/1992 | Warwick et al. | |
| 5,284,293 | A | 2/1994 | Alpern et al. | |
| 5,425,474 | A | 6/1995 | Dalea et al. | |
| 5,447,253 | A | 9/1995 | Williams | |
| 5,690,230 | A | 11/1997 | Griffith | |
| 5,842,441 | A | 12/1998 | Gjerlov | |
| 6,598,737 | B2 | 7/2003 | Rudnick | |
| 7,100,794 | B2 | 9/2006 | Sakamoto | |
| 7,374,076 | B2 * | 5/2008 | Holley, Jr. | B65D 71/36 206/427 |
| 8,118,212 | B2 | 2/2012 | Miller | |
| 10,065,762 | B2 | 9/2018 | Schultz et al. | |
| 10,179,671 | B2 | 1/2019 | Umentum et al. | |
| 10,543,955 | B1 | 1/2020 | Turturro et al. | |
| 11,273,951 | B1 | 3/2022 | DuBois et al. | |
| 11,427,378 | B2 | 8/2022 | Schultz et al. | |
| 2005/0199688 | A1 | 9/2005 | Fogle et al. | |
| 2013/0206787 | A1 | 8/2013 | Shiell | |
| 2015/0203282 | A1 | 7/2015 | Umentum et al. | |
| 2019/0217988 | A1 | 7/2019 | Umentum et al. | |
| 2020/0317391 | A1 | 10/2020 | Schultz et al. | |
| 2021/0253299 | A1 | 8/2021 | Dean et al. | |
| 2021/0346204 | A1 * | 11/2021 | Goldberg | A41D 13/1184 |
| 2024/0043168 | A1 | 2/2024 | Dean et al. | |

FOREIGN PATENT DOCUMENTS

| | | | |
|---|---|---|---|
| EP | 1 604 904 | A1 | 12/2005 |
| FR | 2 882 031 | A1 | 8/2006 |
| FR | 3 040 987 | A1 | 3/2017 |
| GB | 755009 | A | 8/1956 |
| GB | 2 268 159 | A | 1/1994 |
| JP | H 03148475 | A | 6/1991 |
| WO | WO 98/08461 | A2 | 3/1998 |
| WO | WO 2012/047510 | A1 | 4/2012 |

* cited by examiner

EYEWEAR DISPENSING ASSEMBLY

RELATED APPLICATIONS

The present application claims priority to U.S. Provisional Application Ser. No. 63/555,969, filed on Feb. 21, 2024, which is incorporated herein in its entirety by reference thereto.

FIELD OF THE INVENTION

The present invention relates in general to a dispensing assembly, and more particularly to an eyewear (e.g., face shield, safety glasses, goggle, etc.) dispensing assembly and methods of making same.

BACKGROUND OF THE INVENTION

A variety of single use, disposable products such as eyewear (e.g., face shields, safety glasses, goggles, etc.), face masks, gloves, and the like are often packaged in bulk in dispensing cartons. These dispensing cartons frequently have an opening or dispensing orifice cover for removal of the articles individually from the carton.

Because such single use, disposable products are often used in healthcare settings as personal protective equipment (PPE) to prevent hazardous biological fluids from coming into contact with healthcare professionals, it is important for healthcare professionals to have efficient and easy access to these products.

In the case of protective eyewear in particular, single use, disposable products may be shipped in a container or box in bulk, and the products may remain the container or box until needed. When a face shield, protective glasses, or goggles is needed, a healthcare worker typically locates the container, opens the container, removes a single face shield, pair of glasses, or goggles from the container, and then closes the container. This process can be time-consuming, particular in a fast-paced healthcare environment where the amount of time to don personal protective equipment can make a difference in patient outcomes. Further, it is common for eyewear to be shipped separately and then need to be assembled by the user, which elevates the need for a user to assemble. In this regard, it would be helpful if the packaging in which the eyewear was shipped could provide a consistent means of storing and dispensing the eyewear, where eyewear is typically handled in a loose bulk polybag.

As such, a need exists for new and improved dispensing assemblies for dispensing personal protective equipment (PPE) products. More specifically, assemblies that effectively dispense individual products, e.g., eyewear (e.g., face shields, safety glasses, goggles, etc.) without a risk of the additional products in the dispenser being dispensed as well would be welcomed in the art in order to reduce waste. The need for such assemblies is particularly apparent for larger volume packages having contents that move around substantially and may be easily removed from a dispenser opening, particularly in a health care environment.

BRIEF SUMMARY OF THE INVENTION

Aspects and advantages of the invention will be set forth in part in the following description, or may be obvious from the description, or may be learned through practice of the invention.

The present invention is directed to a dispensing assembly. The assembly includes a dispenser having a front panel, a rear panel, a top panel, a bottom panel, a first side panel, and a second side panel, and an attachment panel, wherein the front panel, the rear panel, the top panel, the bottom panel, the first side panel, and the second side panel define an internal chamber configured to receive a stack of articles. The dispenser further includes a dispensing opening, wherein at least a portion of the dispensing opening is formed in the front panel, wherein a portion of the front panel forms a nose extending toward the dispensing opening to assist with one-by-one dispensing of articles from the stack through the dispensing opening, wherein a first side of the opening is defined by the first side panel and a second side of the opening is defined by the second side panel. The assembly further includes a shelf contained within the internal chamber. The assembly further includes a retainer configured to maintain the stack of articles in a predetermined arrangement within the internal chamber, wherein the retainer is integrally formed from a single piece of material with the front panel, rear panel, first side panel, and second side panel.

In one embodiment, the retainer may extend in a vertical direction within the internal chamber relative to the top panel and the bottom panel.

In another embodiment, the assembly may include at least one fold line between the retainer and one of the front panel, rear panel, first side panel, second side panel, and the attachment panel. Moreover, the at least one fold line may include two fold lines. Further, the retainer may extend from a middle portion of one of the rear panel, first side panel, second side panel, and the attachment panel.

In another embodiment, the retainer may include a first retainer panel and a second retainer panel separated by a fold line. Moreover, the first retainer panel and the second retainer panel may extend generally parallel to each other.

In another embodiment, the retainer may extend generally parallel to the first side panel and the second side panel.

In another embodiment, the retainer may extend generally perpendicular to the front panel and the rear panel.

In another embodiment, a bottom edge of the retainer may be separated from an angled ramp surface of the shelf by a gap. Moreover, the gap may be in a range from about 0.1 inches to about 1 inch.

In another embodiment, the attachment panel may be configured to couple one of the front panel, rear panel, first side panel, and second side panel to a respective other one of the front panel, rear panel, first side panel, and second side panel so the dispenser forms a hexahedron shape.

In another embodiment, at least one of the front panel, the rear panel, the top panel, the bottom panel, the first side panel, the second side panel, the retainer, and the attachment panel may be constructed of carton cardboard stock, paperboard, heavy structural paper, container stock, corrugated paperboard, plastic coated paper, a plastic sheet, a wax-coated paper, or a combination thereof.

In another embodiment, the articles may include personal protective equipment in the form of a face shield, glasses, or goggles.

In another embodiment, the assembly may further include a dust cover insert configured to cover an entirety of the dispensing opening.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
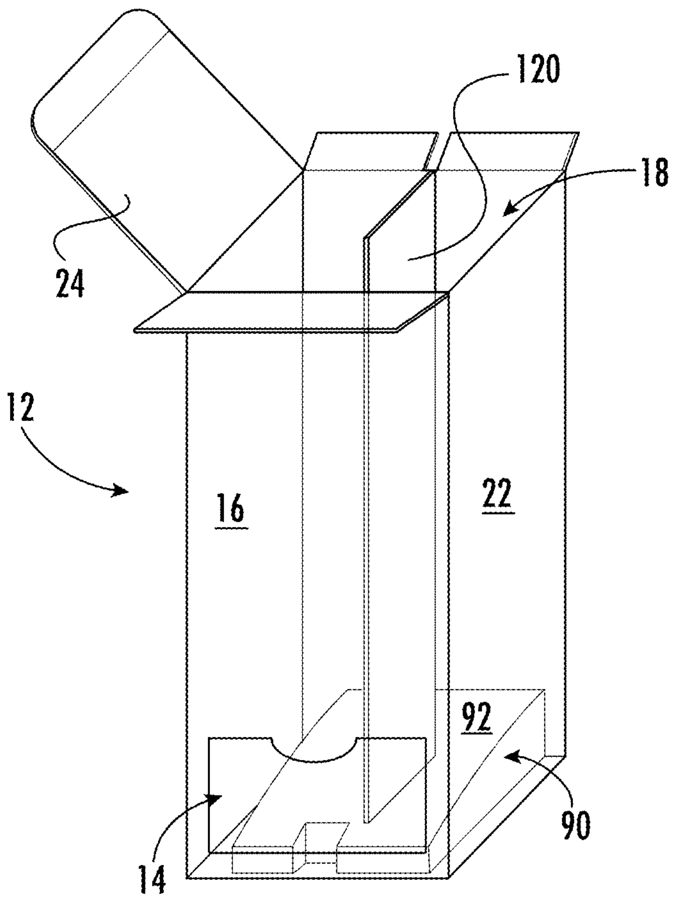
FIG. 1 illustrates a perspective view of one embodiment of a dispenser for dispensing a plurality of articles, such as eyewear (e.g., face shields) according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally speaking, the present invention is directed to a dispensing assembly for dispensing articles, such as personal protective equipment including but not limited to disposable eyewear (e.g., face shields, safety glasses, goggles, etc.), face masks, gloves, etc. The dispensing assembly includes a dispenser having a plurality of panels (e.g., a front panel, a rear panel, a top panel, a bottom panel, a first side panel, and a second side panel) that define an internal chamber configured to receive a stack of articles. The dispenser includes a retainer integrally formed with the plurality of panels. For instance, the retainer extends into the chamber from one of the panels, e.g., along at least one fold line. The present inventors have found that the specific design of the retainer allows it to function as a retention mechanism for the articles within the dispenser. Moreover, the present inventors have found that the formation of the insert from a single blank of material contiguous with the dispenser inhibits the insert from being dislodged from its place, which may improve prevention of tangling of articles within the container from occurring during shipping or storage.

Referring now to the drawings, FIG. 1 illustrates a perspective view of one embodiment of a dispensing assembly 10 for dispensing a plurality of articles 2, such as eyewear (e.g., face shields) according to the present disclosure. The dispensing assembly 10 includes a dispenser 12 having a dispensing opening 14. The dispensing assembly 10 may include a shelf 90 disposed within the dispenser 12 that is configured to position the articles 2 within the dispenser 12 to facilitate dispensing of the articles from the assembly of an exemplary dispensing assembly 10 or package for dispensing the articles 2 such as, for example, disposable eyewear (e.g., face shields, safety glasses, goggles, etc.) face masks, examination gloves, paper products (e.g., tissues, paper towels, etc.), dust mitts, or the like. The dispensing assembly 10 includes a retainer 120 configured to retain the articles 2 in a predetermined arrangement, e.g., a stack, within the dispenser 12 in order to maintain the relative orientation of each of the articles 2. The arrangement of the retainer 120 relative to the dispenser 12 and the articles 2 can create a support for the articles and prevent tangling of the articles within the dispenser 12. Further, the dispensing assembly 10 may include a dust cover 80 configured to be inserted within the dispenser 12 to cover the dispensing opening 14, e.g., to prevent dust or other debris from entering the dispenser 12 through the dispensing opening 14 when the dust cover 80 is in place. The dispenser 12, shelf 90, retainer 120 and dust cover 80 each may be constructed of any suitable material such as, for example, carton cardboard stock, paperboard, heavy structural paper, container stock, corrugated paperboard, plastic coated paper, a plastic sheet, a wax-coated paper or the like, or a combination thereof. In some aspects of the invention, as described in further detail below, the retainer 120 may be integrally formed with the dispenser 12, e.g., from a single piece of continuous material. In other words, the retainer 120 may be integrally formed with the dispenser 12 from a contiguous piece of material.

Figure 2:
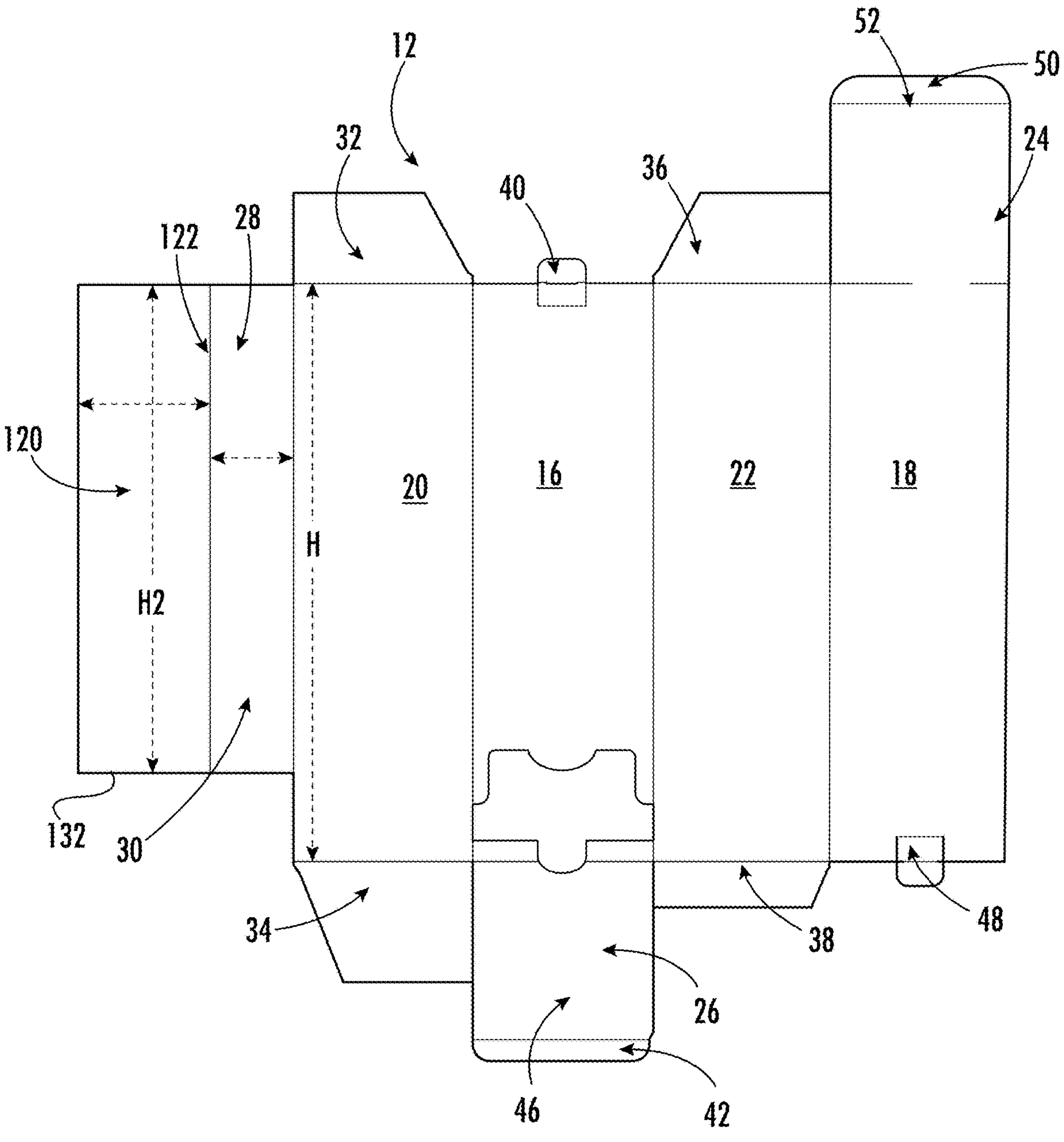
FIG. 2 illustrates a front view of an unassembled dispenser according to the present disclosure.

As shown in FIG. 2, the dispenser 12 includes a front panel 16, rear panel 18. a first side panel 20, a second side panel 22, a top panel 24, and a bottom panel 26. The front panel 16 and the rear panel 18 may be formed opposite each other when the dispenser 12 is in its assembled arrangement, e.g., as shown in FIG. 1. The first side panel 20 and the second side panel 22 may be formed opposite each other when the dispenser 12 is in the assembled arrangement. The top panel 24 and the bottom panel 26 may be formed opposite each other when the dispenser 12 is in the assembled arrangement. For instance, the front panel 16 and rear panel 18 may be generally parallel to each other. Similarly, the first side panel 20 and the second side panel 22 may be generally parallel to each other. Similarly still, the top panel 24 and the bottom panel 26 may be generally parallel to each other. Adjacent panels, e.g., the front panel 16 and the first side panel 20 or the rear panel 18 and the top panel 24, may have an angle in a range from about 70 degrees to about 110 degrees between the panel. For instance, adjacent panels, e.g., the front panel 16 and the first side panel 20 or the rear panel 18 and the top panel 24, may be disposed generally perpendicular to each other. In the described assembled arrangement, the front panel 16, rear panel 18, first side panel 20, second side panel 22, top panel

24, and bottom panel 24 may be constructed and arranged such that the assembled arrangement of the dispenser 12 takes on the form of a hexahedron, such as a rectangular prism.

As shown in FIG. 2, the dispenser 12 can be formed from a single piece of material such that all of the front panel 16, rear panel 18, first side panel 20, second side panel 22, top panel 24, and bottom panel 26 are formed from a single continuous piece of material and folded between the panels. The dispenser 12 may include an attachment panel 28 extending generally parallel to and extending from at least one of the front panel 16, rear panel 18, first side panel 20 and/or second side panel 22. The attachment panel 28 may be configured to be folded generally perpendicular relative to its adjacent panel and coupled to another one of the front panel 16, rear panel 18, first side panel 20 and/or second side panel 22 to maintain the front panel 16, rear panel 18, first side panel 20 and second side panel 22 in a generally rectangular shape. For instance, the attachment panel 28 may extend from the rear panel 18 and may be coupled to the first side panel 20 in the assembled arrangement of the dispenser 12. In one exemplary aspect of the invention, an adhesive or other coupling material may be applied to a front surface 30 of the attachment panel 28 and adhered to a back surface (not shown) of the first side panel 20 to couple the attachment panel 28 to the first side panel 20 in a manner that makes the first side panel 20 adjacent to and generally perpendicular to the rear panel 18.

The dispenser 12 may further include one or more additional fold panels and/or flaps configured to maintain the closed and folded arrangement of the dispenser 12. For instance, the first side panel 20 may have a first top fold panel 32 and/or a first bottom fold panel 34 extending from top and bottom edges of the first side panel 20, respectively. Similarly, the second side panel 22 may have a second top fold panel 36 and/or a second bottom fold panel 38 extending from top and bottom edges of the second side panel 22, respectively. Each of the first top fold panel 32, first bottom fold panel 34, second top fold panel 36, and second bottom fold panel 38 can have at least two free non-parallel edges (i.e., edges not directly in contact with the first side panel 20 and/or second side panel 22), for instance, three or more free non-parallel edges.

The one or more additional fold panels and/or flaps configured to maintain the closed and folded arrangement of the dispenser 12 may further include one or more insertion tabs configured to extend from one of the front panel 16, rear panel 18, first side panel 20, second side panel 22, top panel 24, and bottom panel 26 and configured to be inserted into a retaining opening in the dispenser 12 when the dispenser 12 is in the assembled arrangement. For instance, a rear bottom insertion tab 42 may extend from the bottom panel 26. The rear bottom insertion tab 42 may be configured to be inserted into an opening disposed along the bottom edge of the rear panel 18. For instance, the opening can be formed between a bottom edge of the rear panel 18 and one or more edges of the first bottom fold panel 34 and/or second bottom fold panel 38 that may extend generally parallel to or near the bottom edge of the rear panel 18 when the dispenser 12 is in the assembled arrangement. The rear bottom insertion tab 42 may have a width equal to or less than a width of the bottom panel 26. One or more cut lines may be formed along an edge between the bottom panel 26 and the rear bottom insertion tab 42, e.g., to aid insertion of the rear bottom insertion tab 42 into the opening and/or to receive a cooperating insertion tab. For example, a rear panel insertion tab 48 may extend from the rear panel 18 and may be inserted into an opening 46 along the edge between the bottom panel 26 and the rear bottom insertion tab 42.

Similarly, a front panel insertion tab 40 may extend from a top edge of the front panel 16 and a front top insertion tab 50 may extend from a front edge of the top panel 24. The front top insertion tab 50 may have a width equal to or less than a width of the top panel 24. Optionally, one or more cut lines may be formed along an edge between the top panel 24 and the front top insertion tab 50, e.g., to aid insertion of the front top insertion tab 50 into an opening 52 and/or to receive the front panel insertion tab 40 therein.

The front panel insertion tab 40 may extend symmetrically along a vertical line of symmetry of the front panel 16 such that the front panel insertion tab 40 is centered along the top edge of the front panel 16. The front panel insertion tab 40 may extend the width of the front panel 16, or the front panel insertion tab 40 may be narrower than the front panel 16 in a width direction. The rear panel insertion tab 48 may have a similar arrangement with respect to the rear panel 18 as the front panel insertion tab 40 to the front panel 16, such that the rear panel insertion tab 48 is centered along a vertical line of symmetry of the rear panel 18. In some aspects of the present invention, it may be beneficial for the front panel insertion tab 40 and the rear panel insertion tab 48 to each have a width that is less than a width of the front panel 16 and rear panel 18, respectively, less than a width of the top panel 24 and bottom panel 26, respectively, and less than a width of the front top insertion tab 50 and the rear bottom insertion tab 42, respectively, such that the front panel insertion tab 40 and the rear panel insertion tab 48 may be retained along the edges of the front and rear panels without compromising the structural integrity of the front top insertion tab 50 and the rear bottom insertion tab 42, respectively.

The dispensing assembly 10 further includes a shelf 90 configured to be inserted within the internal chamber 60 of the dispenser 12. Specifically, the shelf 90 is configured to be seated on the bottom panel 26 of the dispenser 12 in the assembled arrangement such that the shelf 90 provides a shelf support for the articles 2 to be dispensed through the dispensing opening 14. The shelf 90 includes a ramp 92 configured to form a support for the articles 2 within the internal chamber 60. The shelf 90 may be formed from a single piece of material such that the entirety of the shelf 90, including the ramp 92, is formed from a single continuous piece of material and folded to form a three-dimensional support structure.

Turning now to FIGS. 2-7, a retainer 120 configured to maintain the stack of articles 2 in a predetermined arrangement within the internal chamber 60 of the dispenser 12 is shown. The retainer 120 may be formed integrally with the dispenser 12. For instance, the retainer 120 may be formed from the same single piece of material as the dispenser 12 and arranged to extend into the chamber 60 relative to the front, back, sides, top, and bottom of the dispenser 12. In some aspects, the retainer 120 may extend from the attachment panel 28, described above.

Figure 3:
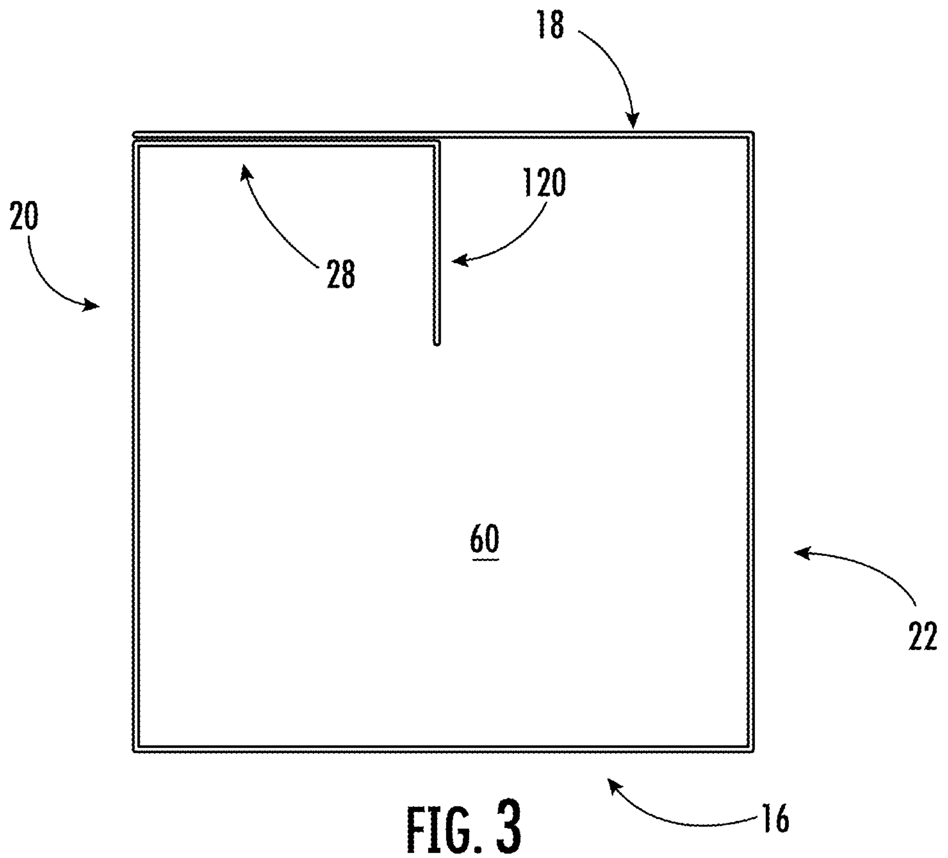
FIG. 3 illustrates a top-down schematic view of the dispenser of FIG. 2 in an assembled configuration.

FIGS. 2-3 illustrate an arrangement of a dispenser 12 having a retainer 120 extending from one side of the attachment panel 28. While FIG. 2 illustrates the retainer 120 and attachment panel 28 extending laterally from the first side panel 20, it is to be understood that the attachment panel 28 and retainer 120 may extend from the rear panel 18, or, in other arrangements, the front panel 16 or second side panel 22. The attachment panel 28 may have a width W extending from the side panel 20 to a fold line 122. The fold line 122 may define where the attachment panel 28 ends and the retainer 120 begins. When the dispenser 12 is assembled, the attachment panel 28 may extend parallel to the rear panel 18 and the retainer 120 may extend or protrude inward into the chamber 60 relative to the rear panel 18 by folding along the fold line, e.g., as best illustrated in the top view of FIG. 3. For instance, the width of the attachment panel 28 may be about half of a width of the dispenser 12, so that the retainer 120 extends from a midpoint or generally middle portion of the dispenser 12 when viewed from the front. In this manner, contents of the dispenser within the chamber 60 may be aligned on either side of the retainer 120.

Figure 4:
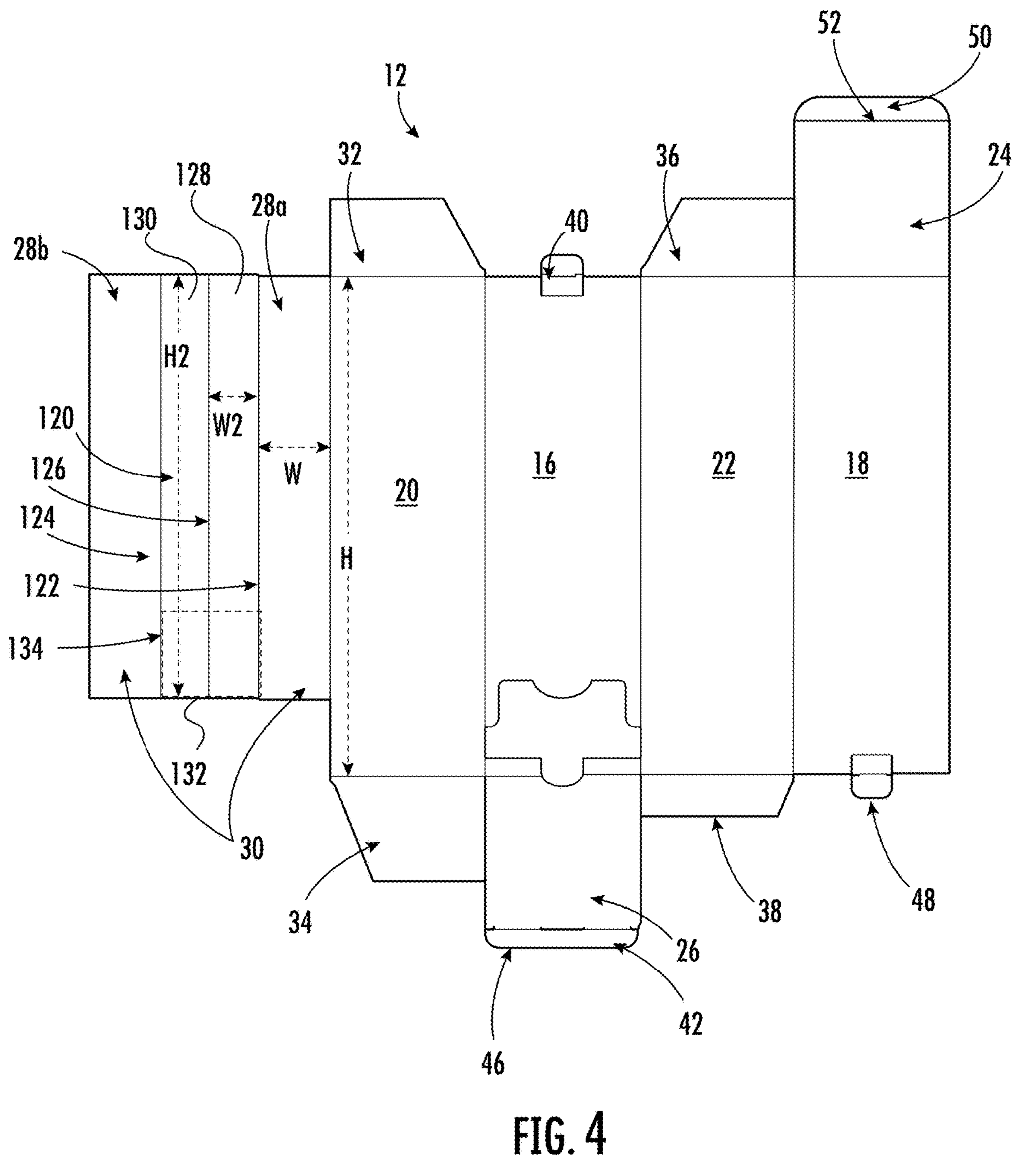
FIG. 4 illustrates a front view of an unassembled dispenser according to the present disclosure.
Figure 5:
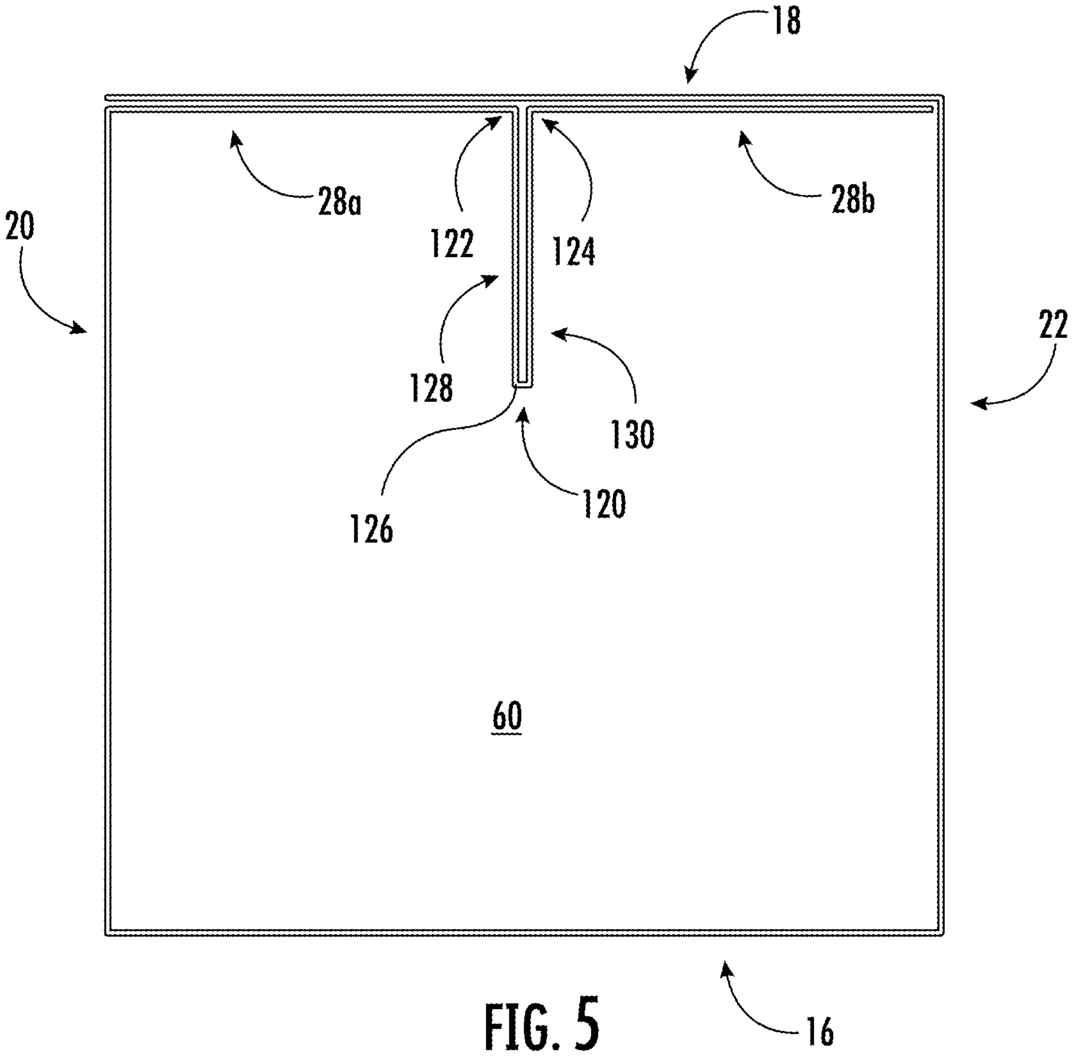
FIG. 5 illustrates a top-down schematic view of the dispenser of FIG. 4 in an assembled configuration.

FIGS. 4-5 illustrate an arrangement of a dispenser 12 having a retainer 120 extending from a central portion of an attachment panel 28. While FIG. 4 illustrates the retainer 120 and attachment panel 28 extending laterally from the first side panel 20, it is to be understood that the attachment panel 28 and retainer 120 may extend from the rear panel 18, or, in other arrangements, the front panel 16 or second side panel 22. The attachment panel 28 may have a first portion 28*a* and a second portion 28*b*. The retainer 120 may extend between the first portion 28*a* and the second portion 28*b*. For instance, a fold line 122 may extend between the first portion 28*a* and the retainer 120, and a fold line 124 may extend between the second portion 28*b* and the retainer 120. The retainer 120 may include a central fold line 126 disposed about halfway between the fold line 122 and the fold line 124. Each of the fold lines 122, 124, 126 may extend parallel to each other. When the dispenser 12 is assembled, the first attachment panel 28*a* and the second attachment panel 28*b* may be disposed generally parallel to the rear panel 18 of the dispenser 12. Along the fold lines 122, 124 the retainer 120 may be folded in a generally perpendicular direction away from the first attachment panel 28*a* and the second attachment panel 28*b*, respectively, such that the retainer 120 extends inwardly into the chamber 60. Along the central fold line 126, the retainer 120 may be folded back onto itself so that a first retainer panel 128 and a second retainer panel 130 may be generally parallel to each other.

The arrangement of the dispenser 12 illustrated in FIGS. 4-5 may provide additional structural stability to the dispenser 12. Specifically, the attachment panels 28*a*, 28*b* may reinforce the rear panel 18 by overlapping the rear panel 18, e.g., as shown in the top-down view of FIG. 5.

Figure 6:
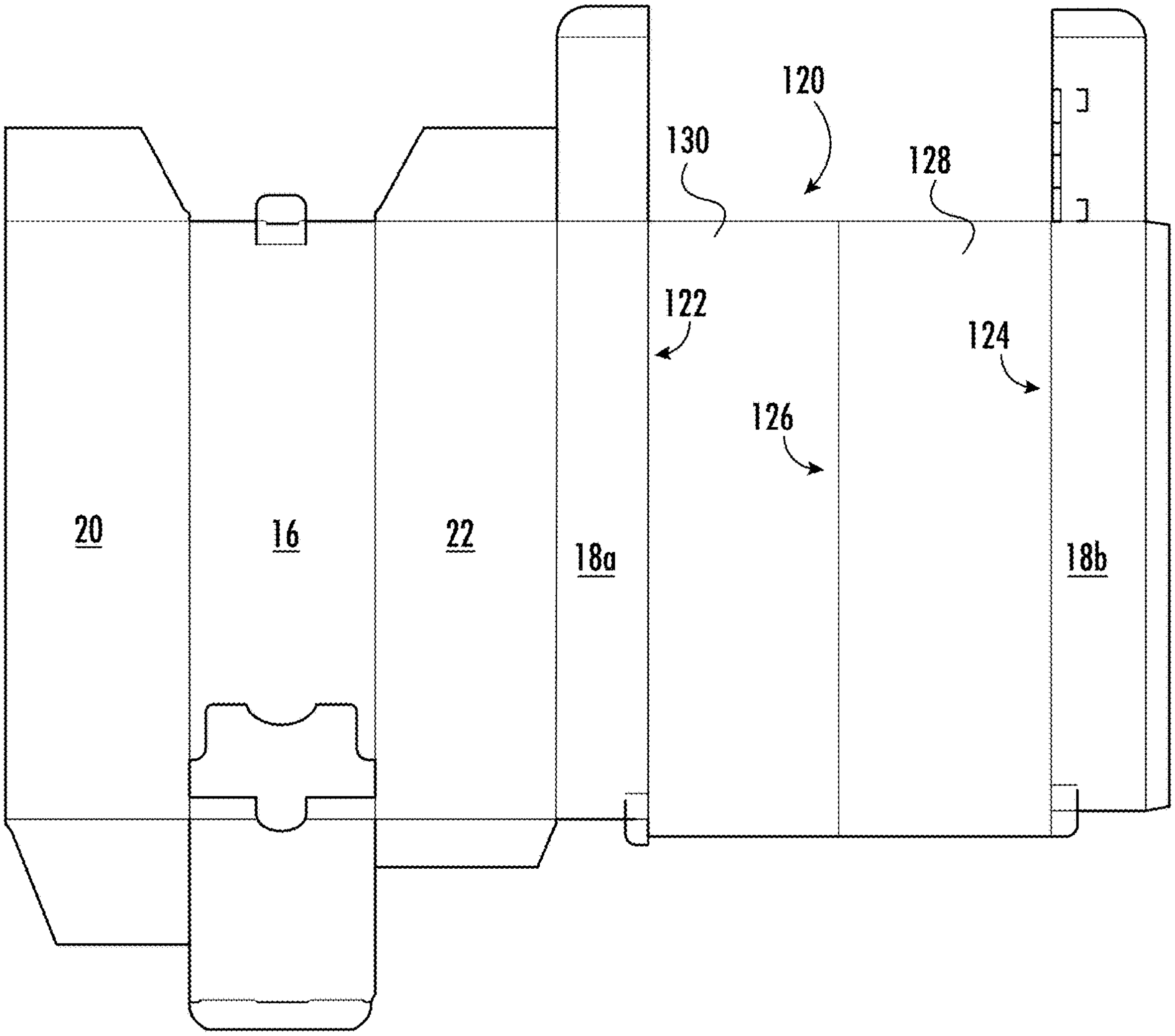
FIG. 6 illustrates a front view of an unassembled dispenser according to the present disclosure.
Figure 7:
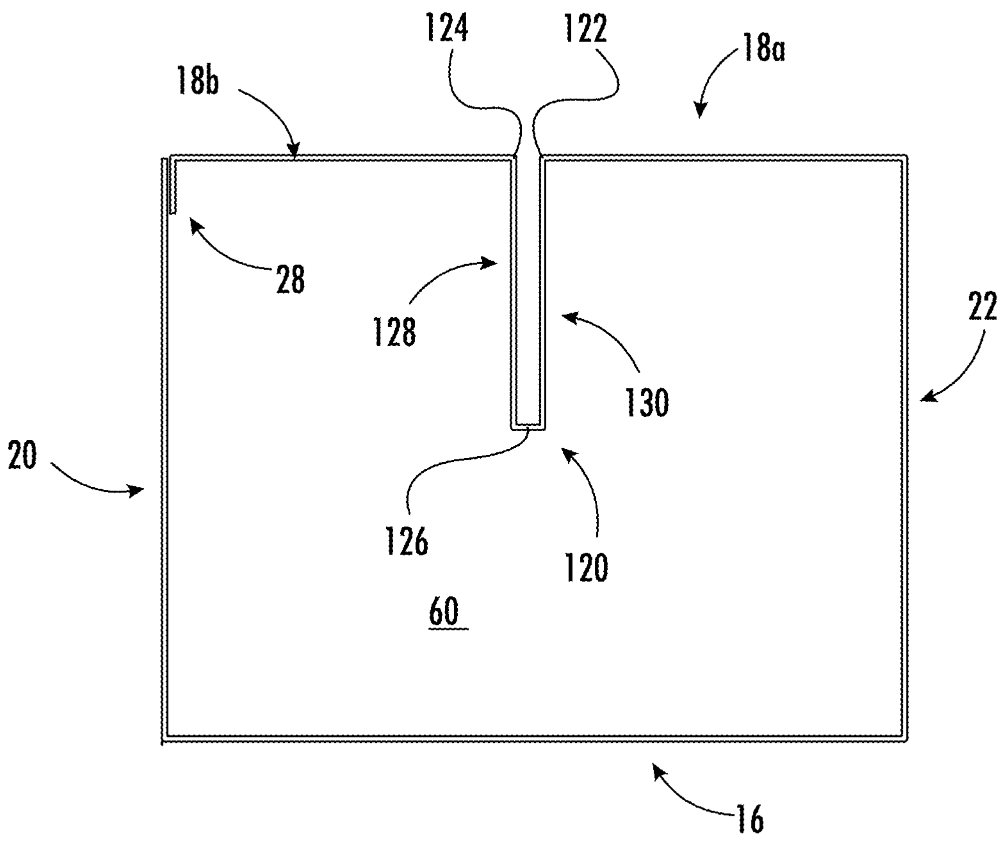
FIG. 7 illustrates a top-down schematic view of the dispenser of FIG. 6 in an assembled configuration.

FIGS. 6-7 illustrate another arrangement of a dispenser 12. The dispenser 12 of FIGS. 6-7 is similar to that of FIGS. 4-5 in that the retainer 120 extends from a central portion of a panel; however, instead of extending from an attachment panel, the retainer 120 extends within the rear panel 18 of the dispenser 12. For instance, the rear panel 18 is split into a first rear panel 18*a* and a second rear panel 18*b*, and the retainer 120 may extend between the first rear panel 18*a* and the second rear panel 18*b*. For instance, a fold line 122 may extend between the first rear panel 18*a* and the retainer 120, and a fold line 124 may extend between the second rear panel 18*b* and the retainer 120. The retainer 120 may include a central fold line 126 disposed about halfway between the fold line 122 and the fold line 124. Each of the fold lines 122, 124, 126 may extend parallel to each other. When the dispenser 12 is assembled, the first rear panel 18*a* and the second rear panel 18*b* may be disposed generally parallel to the front panel 16 of the dispenser 12. Along the fold lines 122, 124 the retainer 120 may be folded in a generally perpendicular direction away from the first rear panel 18*a* and the second rear panel 18*b*, respectively, such that the retainer 120 extends inwardly into the chamber 60. Along the central fold line 126, the retainer 120 may be folded back onto itself so that a first retainer panel 128 and a second retainer panel 130 may be generally parallel to each other.

In some aspects, e.g., as illustrated in FIG. 4, the retainer 120 may have a height H2 that is less than (i.e., shorter than) the height H of the assembled dispenser 12 so that a lower edge 132 of the retainer 120 may be flush with the ramp 92 and/or so that there is a gap between the lower edge 132 of the retainer 120 and the ramp 92. For instance, as shown in FIGS. 2-4, the retainer 120 may extend from the top of the dispenser 12 to a bottom edge 132 that is higher than a bottom edge of the front panel 16, rear panel 18, and side panels 20, 22 relative to the bottom of the dispenser 12 (e.g., panel 26). As shown in FIGS. 2 and 3, the attachment panel 28 may have the same H2 as the retainer 120 in some embodiments.

Figure 9:
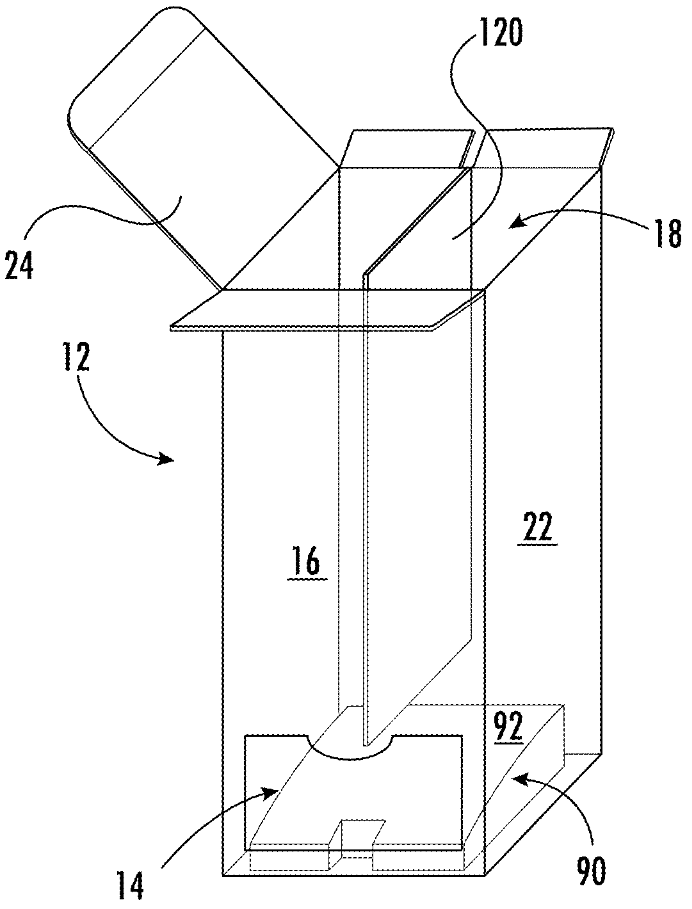
FIG. 9 illustrates a perspective view of one embodiment of a dispenser for dispensing a plurality of articles, such as eyewear (e.g., face shields) according to the present disclosure having a retainer not in contact with a shelf.

FIG. 4 illustrates an arrangement in which the height H2 of the retainer 120 is shorter than the height of the attachment panel 28, which may be generally the same as the height H of the dispenser. For instance, a portion 134 (shown in dashed lines in FIG. 4) of the retainer 120 can be removed relative to the attachment panel 28 to achieve the shorter height H2. In this manner, the retainer 120 can be customized to align with the particular dimensions of a shelf 90. For instance, FIG. 9 illustrates a dispenser 12 in which the height H2 of the retainer is shorter than the height H of the dispenser 12. A gap may be provided between the ramp 92 and the lower edge 132 of the retainer 120. The gap may be in a range from about 0.1 inch to about 1 inch, such as from about ⅛ inch (about 0.125 inch) to about 0.5 inch, such as from about ⅛ inch (about 0.125 inch) to about 0.25 inch. In this manner, the retainer 120 may retain the articles 2 within the dispenser 12 in a stack above the ramp 92 without contacting or pushing on the ramp 92 or buckling the retainer 120 along its length.

Figure 8:
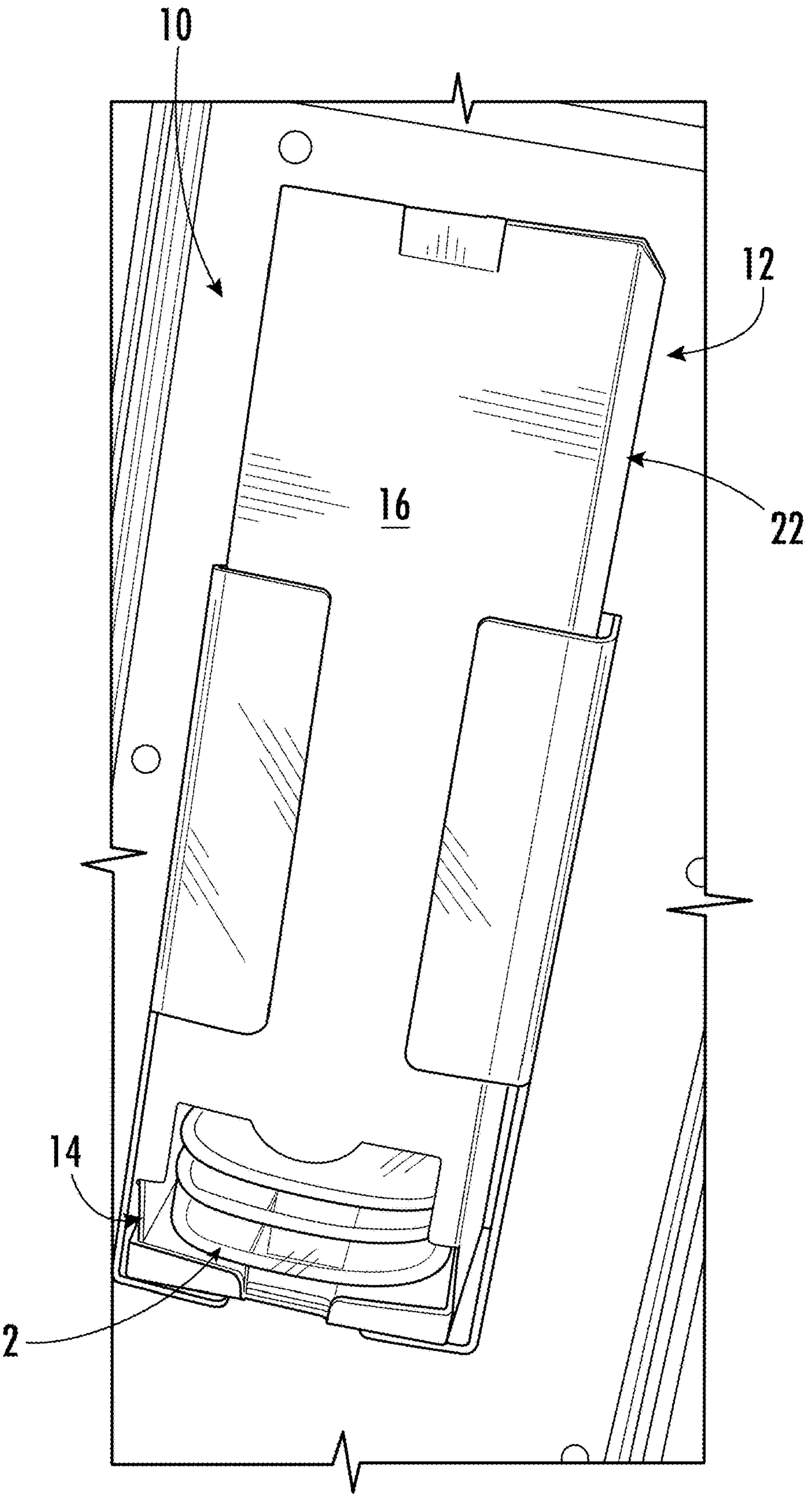
FIG. 8 illustrates a perspective view of a dispensing assembly for dispensing a plurality of articles, such as eyewear (e.g., face shields) according to the present disclosure.

When the retainer 120 extends within the dispenser 12 as described above, the retainer 120 may extend vertically within the internal chamber 60 in a manner that maintains a stack of articles 2 within the internal chamber 60. For instance, when the stack of articles 2 is formed by a stack of protective eyewear, the retainer 120 may extend vertically between the side arms of the protective eyewear from the rear panel 18 towards the front panel 16 of the dispenser 12. In this arrangement, the retainer 120 may prevent twisting and/or tangling of the side arms of adjacent articles 2 in the stack. As a result, the articles 2, e.g., protective eyewear, can be maintained in a vertically arranged stack, such as a vertically arranged single-file stack. As shown in FIG. 8, the protective eyewear may be stacked with each protective eyewear article upside down (i.e., arms down and lens facing up) at the bottom of the dispenser 12 (e.g., resting on the shelf 90) with the lenses presented toward the front panel 16 of the dispenser 12.

Figure 10:
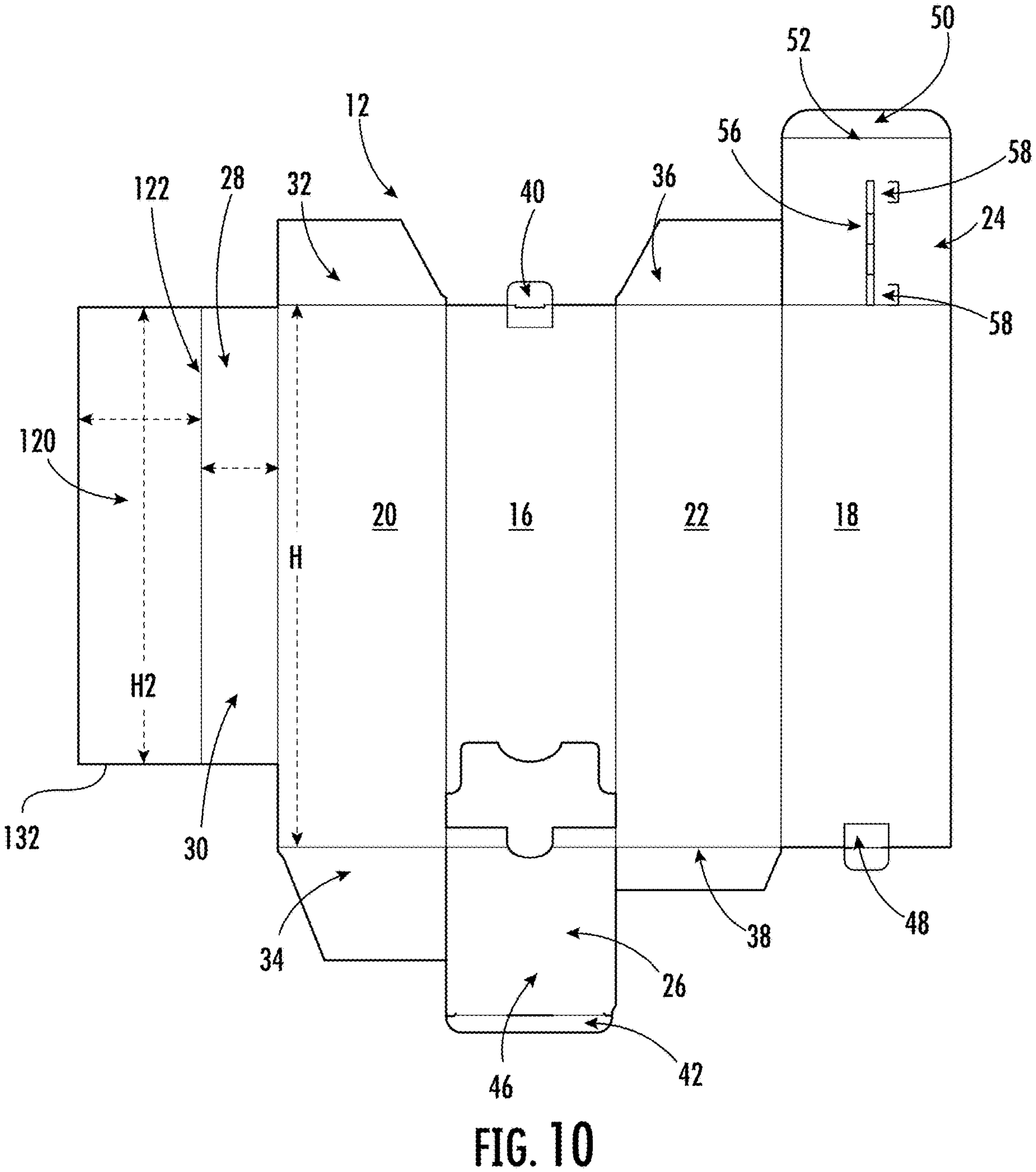
FIG. 10 illustrates a front view of an unassembled dispenser including a retaining flap for the top panel according to the present disclosure.

FIG. 10 illustrates another aspect of the retainer 120 and dispenser 12 of the present invention including a retaining flap 140 extending from an upper end of the retainer 120 and a slot 56 formed through the top panel 24 to hold the retainer 120 in place. The slot 56 may be a cut line formed through the top panel 24, e.g., along a center of the top panel 24 as shown in FIG. 10. The retaining flap 140 may be configured to be inserted through the slot 56 to extend outside the internal chamber 60 of the dispenser 12. The retaining flap 140 may include one or more tabs 142, e.g., two tabs 142, and the top panel 24 may include complementary tab receiving slots 58. The tabs 142 may each be inserted into a complementary tab receiving slot 58 to be tucked under the top panel 24 to maintain the retaining flap 140 in place. In this arrangement, the retainer 120 can be maintained in place relative to the top panel 24 and the internal chamber 60 of the dispenser 12. In other words, by coupling the retainer 120 to the top panel 24, the retainer 120 may be held in place in a generally central location within the internal chamber 60 and prevented from being angled, pushed, or pulled by the articles 2 within the chamber 60 towards one of the side panels 20 or 22.

In some aspects of the present invention, more than one retainer 120 may be included in the dispenser assembly 100. For example, two parallel retainers 120 may be included within the dispenser 12. Additionally or alternatively, rather than a generally two-dimensional retainer 120 as described above, the retainer 120 may have a three-dimensional shape such as a V-shape or U-shape within the dispenser 12 to suit the various support needs based on the selected articles 2 within the dispenser 12.

The plurality of articles as described herein is desirably a plurality of disposable articles. As used herein, the term "disposable" refers to a product that may be discarded after only a single use, for instance a product that is so inexpensive that it may be economically discarded after a single use or a product that is used in a healthcare setting that requires sanitary single use of the product to reduce the potential for contamination or infection. Products that are "disposable" are typically intended for single use. The term "single-use" refers to a product that is intended to be used only once and is not intended to be re-used, re-conditioned, restored or repaired after that use. Such products offer advantages in clinical settings by reducing the potential for contamination or infection. In addition, these products can enhance workflow since they are not collected and assembled for reprocessing and reuse. Examples of disposable articles include disposable eyewear (e.g., face shields, safety glasses, goggles, etc.), disposable face masks, disposable examination gloves, and the like.

While various patents have been incorporated herein by reference, to the extent there is any inconsistency between incorporated material and that of the written specification, the written specification shall control. In addition, while the disclosure has been described in detail with respect to specific embodiments thereof, it will be apparent to those skilled in the art that various alterations, modifications and other changes may be made to the disclosure without departing from the spirit and scope of the present disclosure. It is therefore intended that the claims cover all such modifications, alterations and other changes encompassed by the appended claims.

What is claimed is:

1. A dispensing assembly, comprising:

a dispenser comprising a front panel, a rear panel, a top panel, a bottom panel, a first side panel, and a second side panel, and an attachment panel, wherein the front panel, the rear panel, the top panel, the bottom panel, the first side panel, and the second side panel define an internal chamber configured to receive a stack of articles;

a dispensing opening, wherein at least a portion of the dispensing opening is formed in the front panel, wherein a portion of the front panel forms a nose extending toward the dispensing opening to assist with one-by-one dispensing of articles from the stack through the dispensing opening, wherein a first side of the opening is defined by the first side panel and a second side of the opening is defined by the second side panel;

a shelf contained within the internal chamber; and a retainer configured to maintain the stack of articles in a predetermined arrangement within the internal chamber, wherein the retainer is integrally formed from a single piece of material with the front panel, rear panel, first side panel, and second side panel, wherein the retainer extends generally perpendicular to the front panel and the rear panel.

2. The assembly of claim 1, wherein the retainer extends in a vertical direction within the internal chamber relative to the top panel and the bottom panel.

3. The assembly of claim 1, comprising at least one fold line between the retainer and one of the front panel, rear panel, first side panel, second side panel, and the attachment panel.

4. The assembly of claim 3, the at least one fold line comprising two fold lines.

5. The assembly of claim 4, the retainer extending from a middle portion of one of the rear panel, first side panel, second side panel, and the attachment panel.

6. The assembly of claim 1, the retainer including a first retainer panel and a second retainer panel separated by a fold line.

7. The assembly of claim 6, wherein the first retainer panel and the second retainer panel extend generally parallel to each other.

8. The assembly of claim 1, wherein the retainer extends generally parallel to the first side panel and the second side panel.

9. The assembly of claim 1, wherein a bottom edge of the retainer is separated from an angled ramp surface of the shelf by a gap.

10. The assembly of claim 9, wherein the gap is in a range from about 0.1 inches to about 1 inch.

11. The assembly of claim 1, wherein the attachment panel is configured to couple one of the front panel, rear panel, first side panel, and second side panel to a respective other one of the front panel, rear panel, first side panel, and second side panel so the dispenser forms a hexahedron shape.

12. The assembly of claim 1, wherein at least one of the front panel, the rear panel, the top panel, the bottom panel, the first side panel, the second side panel, the retainer, and the attachment panel is constructed of carton cardboard stock, paperboard, heavy structural paper, container stock, corrugated paperboard, plastic coated paper, a plastic sheet, a wax-coated paper, or a combination thereof.

13. The assembly of claim 1, wherein the articles comprise personal protective equipment in the form of a face shield, glasses, or goggles.

14. The assembly of claim 1, further comprising a dust cover insert configured to cover an entirety of the dispensing opening.

* * * * *